(12) United States Patent
Alderson et al.

(10) Patent No.: US 7,016,550 B2
(45) Date of Patent: Mar. 21, 2006

(54) SCENE-BASED NON-UNIFORMITY OFFSET CORRECTION FOR STARING ARRAYS

(75) Inventors: Timothy Alderson, Winter Spring, FL (US); Gene Tener, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 547 days.

(21) Appl. No.: 10/125,348

(22) Filed: Apr. 19, 2002

(65) Prior Publication Data

US 2003/0198400 A1    Oct. 23, 2003

(51) Int. Cl.
*G06K 9/40*    (2006.01)
(52) U.S. Cl. .................. 382/274; 358/448; 250/252.1; 250/332
(58) Field of Classification Search ................ 382/274, 382/272; 250/252.1, 332; 358/448
See application file for complete search history.

(56) References Cited

U.S. PATENT DOCUMENTS

| | | | |
|---|---|---|---|
| 4,783,840 A * | 11/1988 | Song .......................... | 382/261 |
| 4,975,864 A | 12/1990 | Sendall et al. | |
| 5,129,595 A | 7/1992 | Thiede et al. | |
| 5,140,147 A | 8/1992 | Barnett | |
| 5,449,907 A | 9/1995 | McKeeman et al. | |
| 5,563,405 A | 10/1996 | Woolaway, II et al. | |
| 5,619,426 A | 4/1997 | Hutchens et al. | |
| 5,631,466 A | 5/1997 | Botti et al. | |
| 5,693,940 A | 12/1997 | Botti et al. | |
| 5,717,208 A | 2/1998 | Woolaway, II | |
| 5,721,427 A | 2/1998 | White et al. | |

(Continued)

FOREIGN PATENT DOCUMENTS

EP    0653882 A1 *    5/1995

OTHER PUBLICATIONS

Gene D. Tener et al., "Extended Range Image Processing for Electro-optical Systems", Unpublished U.S. Appl. No. 09/841,079, filed Apr. 25, 2001.

(Continued)

*Primary Examiner*—Kanjibhai Patel
*Assistant Examiner*—Manav Seth
(74) *Attorney, Agent, or Firm*—Buchanan Ingersoll PC

(57) ABSTRACT

An approach for processing image data is described. The method comprises correcting a frame of image data received from a detector using existing correction coefficients that comprise a plurality of offset coefficients corresponding to a plurality of detector elements. The method also comprises calculating an update parameter for each detector element using pixel data generated from the correction. The update parameter for a given detector element is calculated from multiple difference values determined from a given pixel value of the pixel data and multiple adjacent pixel values. The given pixel value corresponds to the given detector element. Each difference value is determined by subtracting one of the multiple adjacent pixel values from the given pixel value. The method comprises identifying offset coefficients whose existing values are to remain unchanged based upon the update parameters and changing existing values of offset coefficients other than those identified to remain unchanged.

63 Claims, 9 Drawing Sheets

U.S. PATENT DOCUMENTS

| | | | |
|---|---|---|---|
| 5,903,659 A | | 5/1999 | Kilgore |
| 5,925,880 A | * | 7/1999 | Young et al. ............ 250/252.1 |
| 6,023,061 A | | 2/2000 | Bodkin |
| 6,034,789 A | * | 3/2000 | Kawai ........................ 358/474 |
| 6,075,903 A | * | 6/2000 | Breiter et al. ............... 382/261 |
| 6,359,681 B1 | | 3/2002 | Housand et al. |
| 6,522,788 B1 | * | 2/2003 | d'Hautefeuille et al. .... 382/274 |
| 6,591,021 B1 | * | 7/2003 | Breiter et al. ............... 382/274 |
| 6,721,458 B1 | * | 4/2004 | Ancin ........................ 382/261 |

OTHER PUBLICATIONS

Timothy Alderson et al., "Dynamic Range Compression", Unpublished U.S. Appl. No. 09/841,081, Filed Apr. 25, 2001.

Timothy Alderson et al., "Scene-based Non-uniformity Correction for Detector Arrays", Unpublished U.S. Appl. No. 09/840,920, Filed Apr. 25, 2001.

* cited by examiner

300

| | | |
|---|---|---|
| $P_1$ | $P_2$ | $P_3$ |
| $P_4$ | $O$ | $P_5$ |
| $P_6$ | $P_7$ | $P_8$ |

FIG. 3

SCENE-BASED NON-UNIFORMITY OFFSET CORRECTION FOR STARING ARRAYS

BACKGROUND

1. Field of the Invention

The present invention relates to non-uniformity correction of imagery collected by a detector array. More particularly, the present invention relates to scene-based non-uniformity correction of imagery collected by a staring, two-dimensional detector array.

2. Background Information

Imagery collected using infrared detectors (or sensors) suffers from fixed pattern noise (FPN) due to variations in pixel gain (responsivity) and pixel offset (level) of the detector. Non-uniformity correction (NUC) can be used to correct such imagery for such variations in gain and offset between detector elements of the detector. A standard technique for correcting FPN is by generating correction coefficients comprising gain and offset terms for each detector element of a detector array based on a linear calibration using thermal reference (calibration) sources of known temperatures. This type of correction can remove FPN over a specific temperature range for a given period of time. However, this type of correction requires recalibration of the gain and offset terms due to drift of the detector and changes in scene temperature. Such recalibration can be costly and time consuming.

To address these shortcomings, scene-based non-uniformity correction (SBNUC) techniques have emerged. Conventional SBNUC techniques may utilize repeated blurring of imagery collected from the scene. In this approach, the non-uniformity correction is based upon processing out-of-focus imagery to avoid memorization of high-frequency scene content by the non-uniformity correction routine. This approach, however, can interfere with an operator's (e.g., a pilot's) ability to consistently view a focused image of the scene.

Conventional SBNUC techniques may also utilize motion of the scene relative to the detector to distinguish FPN from details of the scene image. Because FPN remains in the same detector location while the scene moves, the FPN can be distinguishable from details of the scene. Such motion may be provided by the movement of a platform upon which the detector array is mounted (e.g., an air vehicle). Alternatively, such motion may be provided by "dithering" (moving) the detector array by a known amount using an appropriate dithering mechanism. Such dithering mechanisms are known to those skilled in the art. However, this dithering approach requires additional system complexity for dithering the detector array and requires additional processing of dithered image data.

U.S. Pat. No. 4,975,864 "Scene Based Nonuniformity Compensation For Starting Focal Plane Arrays" discloses a scene-based method and apparatus for providing corrected offset terms. Corrected offset terms can be determined by processing data using a median filter which selectively implements cross (X) shaped and plus (+) shaped filters. An antimedian calculator can determine an antimedian value of the output of the median filter wherein the antimedian value comprises the difference between the central pixel of a respective filter and the median value of all pixels in the cross (X) or plus (+) shaped filter. A third filter can sample each of the signals from the detector array and to compare to a preset value indicative of an anticipated scene intensity level determined by the operator to provide an output signal indicative of the difference. Control circuitry can select which output signal of the filter circuits is to be used to compensate the detector signals during a particular video field. The output signals of the antimedian calculator and the average filter can comprise sign information that indicates whether the central pixel value is less than, equal to or greater than the median, or whether the central pixel is less than, equal to or greater than the preset value, respectively. The control circuitry can increment or decrement the value of the offset terms in response to the signal provided by the selected antimedian calculator or third filter. The control circuitry can provide convergence rate information that controls the rate of convergence of the offset terms toward the scene average.

SUMMARY

A method for processing image data obtained from a detector having a two-dimensional array of detector elements is described. In one aspect, a method of processing image data comprises correcting a frame of image data received from the detector using existing values of a set of correction coefficients. The set of correction coefficients comprises a plurality of offset coefficients corresponding to the plurality of detector elements. The method also comprises calculating an update parameter for each detector element using pixel data generated from the above-noted correction. The update parameter for a given detector element is calculated based upon multiple difference values determined from a given pixel value of the pixel data and multiple adjacent pixel values of the pixel data, wherein the given pixel value corresponds to the given detector element. Each difference value is determined by subtracting one of the multiple adjacent pixel values from the given pixel value. The method comprises identifying offset coefficients whose existing values are to remain unchanged based upon the update parameters and changing existing values of offset coefficients other than those identified to remain unchanged.

The above-noted steps can be repeated iteratively using successive frames of image data from the detector such that updated values of the offset coefficients converge to respective stable values.

In one aspect, the update parameter (PAR) for a given detector element is calculated according to an expression given by $$PAR = \sum_{i=1}^{N} SIGN_{TH}(O - P_i)$$

wherein
  O represents the given pixel value,
  i is an index designating an i-th one of the multiple adjacent pixel values,
  $P_i$ represents an i-th one of the multiple adjacent pixel values,
  N is the number of multiple adjacent pixel values, and
  $SIGN_{TH}(O-P_i)$ is a function that has a value of
    +1 when $(O-P_i)$ is positive and satisfies $TH1 \leq |O-P_i| \leq TH2$,
    −1 when $(O-P_i)$ is negative and satisfies $TH1 \leq |O-P_i| \leq TH2$, and
    zero when $(O-P_i)$ does not satisfy $TH1 \leq |O-P_i| \leq TH2$, wherein TH1 and TH2 are first and second threshold values, respectively.

In another aspect, the step of identifying offset coefficients whose existing values are to remain unchanged can comprise determining whether the update parameter (PAR) associated with a given offset coefficient satisfies the expression $TH3 \leq |PAR| \leq TH4$, where TH3 and TH4 are third and fourth threshold values, respectively. If the update parameter (PAR) does not satisfy this expression, then the existing value of the corresponding offset coefficient is designated to remain unchanged.

In another exemplary aspect of the present invention, an image processing system is provided. The system comprises a memory and a processing unit coupled to the memory, wherein the processing unit is programmed to execute the above noted steps.

In another exemplary aspect of the present invention, there is provided a computer-readable carrier containing a computer program adapted to cause a processor to execute the above-noted steps. In this regard, the computer-readable carrier can be, for example, solid-state memory, magnetic memory such as a magnetic disk, optical memory such as an optical disk, a modulated wave (such as radio frequency, audio frequency or optical frequency modulated waves), or a modulated downloadable bit stream that can be received by a computer via a network or a via a wireless connection.

BRIEF DESCRIPTION OF THE FIGURES

Other objects and advantages of the present invention will become apparent to those skilled in the art upon reading the following detailed description of exemplary embodiments, in conjunction with the accompanying drawings.

Figure 3:
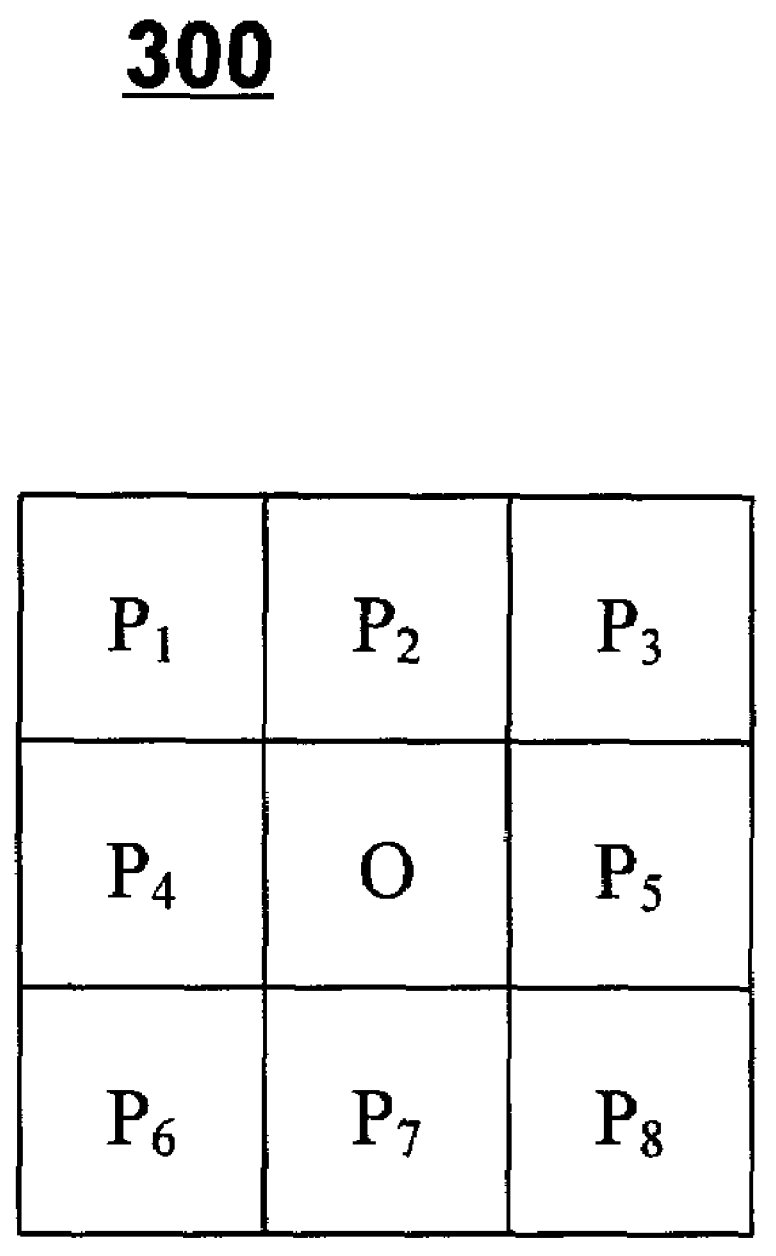

FIG. 3 is an illustration of a 3×3 pixel kernel for processing image data according to an exemplary aspect of the present invention.

DETAILED DESCRIPTION

Figure 1:
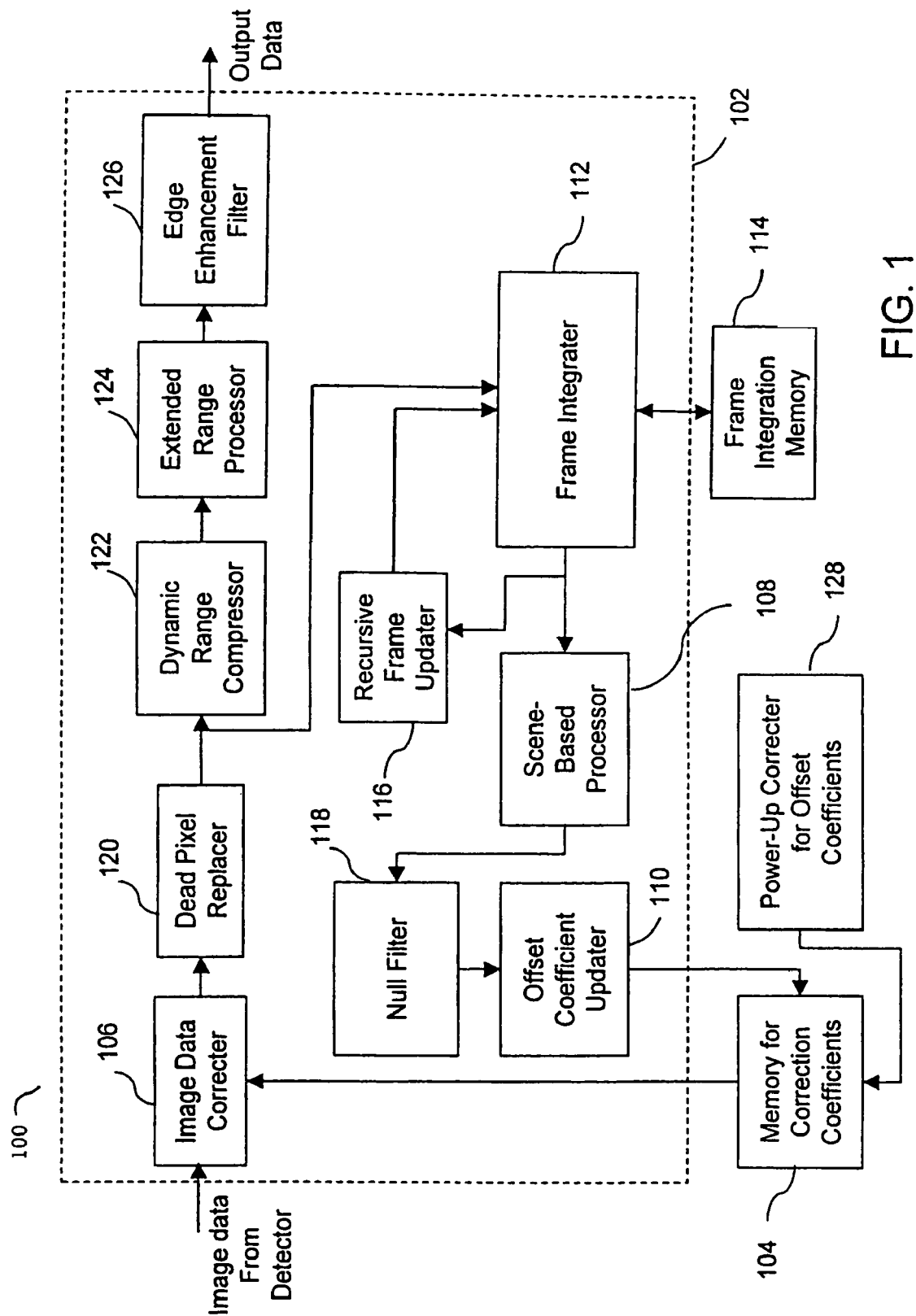
FIG. 1 is a functional block diagram illustrating an image processing system according to an exemplary aspect of the present invention.

FIG. 1 illustrates a functional block diagram of an image processing system 100 for processing image data received from a detector having a plurality of detector elements arranged in a two-dimensional array. The image data can be, for example, image data corresponding to infrared (IR) imagery received using an infrared detector array fabricated from InSb, HgCdTe, or any other IR detector material. However, the invention is not limited to IR imagery and can be utilized with imagery gathered in any wavelength range from any suitable two-dimensional detector array for which fixed-pattern-noise (FPN) correction of the imagery is desired. The image processing system 100 can, for example, be incorporated into a forward looking infrared (FLIR) camera system such as that described in commonly-assigned U.S. Pat. No. 6,359,681 entitled "Combined Laser/FLIR Optics System", the disclosure of which is hereby incorporated herein by reference in its entirety.

As illustrated in FIG. 1, the image processing system 100 comprises a processing unit 102 for processing digital image data received from a detector having a plurality of detector elements arranged in a two-dimensional array and a memory 104. The detector itself can provide digital image data using built-in processing circuitry for carrying out analog-to-digital (A/D) conversion, or a separate A/D converter can be provided for carrying out A/D conversion.

The processing unit 102 can comprise, for example, one or more field programmable gate array (FPGA) devices, such as the Virtex and Virtex-E series devices manufactured by Xilinx, Inc. (San Jose, Calif.). The programming and utilization of FPGA devices in numerical processing is known to those skilled in the art and requires no further discussion. Alternatively, the processing unit 102 can be, for example, a high-performance Altivec microprocessor manufactured by Motorola. Alternatively, the processing unit 102 can be, for example, one or more suitable general purpose microprocessors (e.g., a general purpose microprocessor from Intel, Motorola, or AMD). Where general purpose microprocessors are used, the memory 104 can store a computer program that can be accessed by the processing unit 102 to cause the processing unit 102 to carry out the approaches described herein. Alternatively, the processing unit 102 can be one or more specialized electrical circuits designed to carry out the approaches described herein. In addition, any suitable combination of hardware, software and firmware can be used to carry out the approaches described herein. Moreover, any desired functional blocks illustrated in FIG. 1 can be embodied in individual components or in integral units.

The memory 104 can be any suitable memory for storing correction coefficients (e.g., factory determined moment, gain and offset coefficients and updated offset coefficients) and a computer program. For example, the memory 104 can comprise solid-state memory, optical memory, magnetic memory, etc. The memory 104 can also comprise a combination of non-volatile memory and random access memory. The memory should be large enough to store a desired number of correction coefficients, which comprise a plurality of offset coefficients equal to the number of detector elements (e.g., 65,536 detector elements for a 256×256 pixel mid-wave IR camera), and which can also comprise a plurality of gain coefficients and a plurality of moment coefficients. Of course, the invention is not limited to processing image data from detectors having a 256×256 pixel configuration. The detector size and the frame size can be selected as desired.

Because of manufacturing imperfections, an overall response function of a two-dimensional detector array is not expected to be uniform (i.e., flat). Rather, detector elements viewing the same thermal source and receiving the same radiation dose can yield different output levels measured in voltage or, equivalently, in photon counts. For example, the overall response, $R_j(T1)$, of a given detector element seeing a temperature T1 can differ from an average response, $\overline{R}(T1)$, characteristic of the entire detector array for the given incident radiation.

Figure 2:
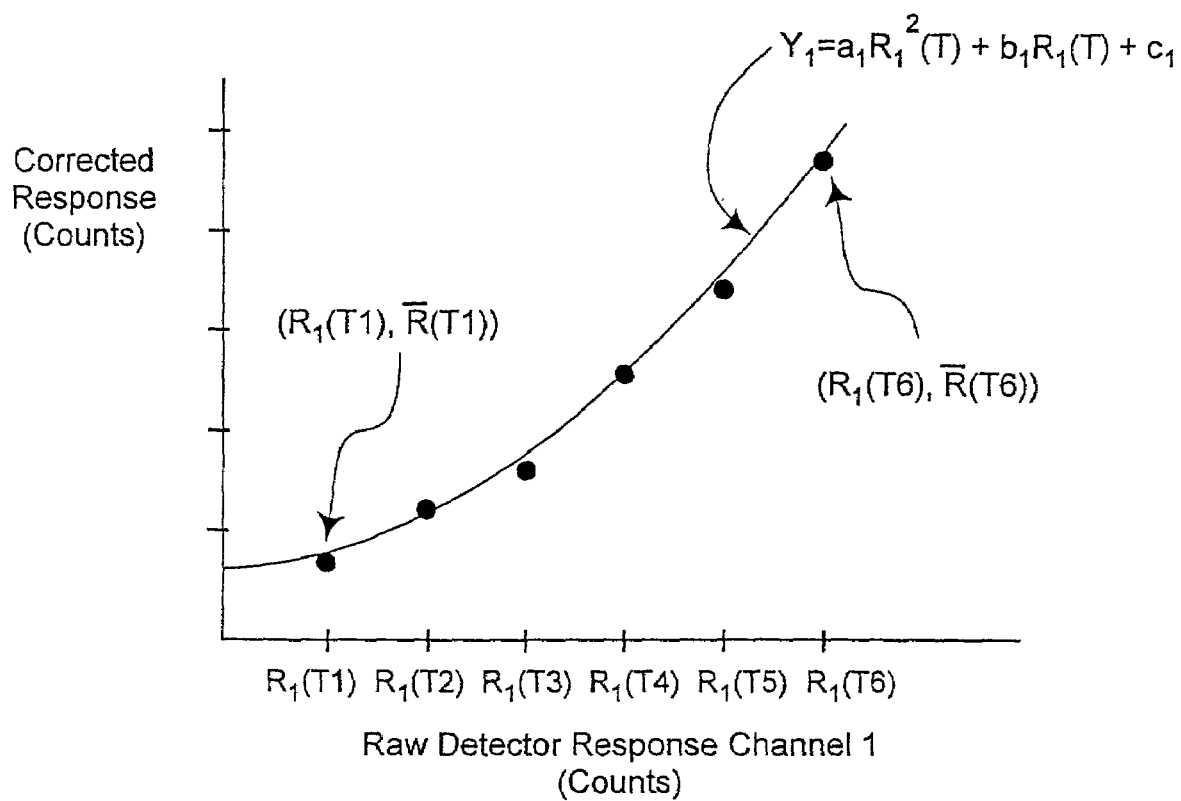
FIG. 2 is an illustration of a hypothetical calibration curve associated with a given detector element (e.g., channel 1) of a detector having a two-dimensional array of detector elements.

In an exemplary aspect of the present invention, detector response data can be collected using the two-dimensional detector array for a plurality of temperatures and fitted with a quadratic formula to provide initial (e.g., factory-calibrated) values of correction coefficients (moment, gain and offset). For example, hypothetical detector response data collected from six known thermal sources at temperatures T1–T6 are illustrated in FIG. 2 for one detector element (e.g., channel 1). In FIG. 2, the average detector response for the detector array overall is plotted versus the individual response of a given detector element (e.g., channel 1) at each temperature. As illustrated by the equation for $Y_1$, the data for each individual element can be fit by a quadratic curve for each individual element wherein the coefficient $a_1$ is a moment coefficient (i.e., corresponding to a quadratic term), $b_1$ is a gain coefficient, and $c_1$ is an offset coefficient. The remaining detector elements can similarly be characterized by a corresponding set of moment, gain and offset coefficients. Exemplary utilization of the correction coefficients for correcting image data from the detector will be described below.

As illustrated in FIG. 1, the image processing system 100 can be viewed as having various functional attributes, which can be implemented via the processing unit 102. In particular, the exemplary image processing system 100 comprises an image data correcter 106 for correcting a frame of image data received from the detector using existing values of a set of correction coefficients stored in the memory 104. The set of correction coefficients comprises a plurality of offset coefficients corresponding to the plurality of detector elements. The set of correction coefficients can also comprise a plurality of gain coefficients, and can comprise a plurality of moment coefficients, such as described above. Utilizing moment coefficients as well as gain and offset coefficients has been found to be advantageous.

A correction can be applied to a frame of image data received from the detector element by element using the characteristic quadratic curve for each element, such as that hypothetically shown in FIG. 2 for element 1. In particular, a given measured signal value corresponding to imagery data can be associated with a value on the X axis of the quadratic curve shown in FIG. 2. This measured signal value can then be directly correlated to a corrected value on the Y axis. It should be noted that correction coefficient data, such as the hypothetical data illustrated in FIG. 2, are determined using a predetermined integration time. If image data to be corrected is expected to be gathered using a different integration time, then initial (e.g., factory-calibrated) values of the correction coefficients should also be provided corresponding to that integration time. Alternatively, the correction coefficient data, such as that illustrated in FIG. 2 can be normalized to integration time if the detector response is sufficiently linear as a function of integration time.

Initially, the existing values of the correction coefficients can be factory-calibrated values of the correction coefficients. Subsequently, the existing values of offset coefficients can be those determined during an initial power-up correction, such as described herein. For subsequent processing, the existing values of the correction coefficients can include updated offset coefficients determined using scene-based approaches described herein. It is desirable to utilize updated values for offset coefficients because initial values of the offset coefficients can fail to provide adequate correction outside the calibration temperature range and can further fail to provide adequate correction as the detector ages, suffers drift, and/or undergoes variations from one power-up to another. With InSb-based detectors, drift of gain coefficients and moment coefficients is less severe, and factory values for gain and moment coefficients can be utilized.

The image processing system 100 also comprises a scene-based processor 108 for calculating an update parameter for each detector element using pixel data generated from the image data correcter 106. The pixel data generated from the image data correcter 106 and processed by the scene-based processor 108 can be corrected image data directly produced by the image data correcter 106. Alternatively, the pixel data processed by the scene-based processor 108 can be frame-integrated data provided by an optional frame integrator 112, described in more detail below. In either case, the update parameter for a given detector element is calculated based upon multiple difference values determined from a given pixel value of the pixel data and multiple adjacent pixel values of the pixel data, wherein the given pixel value corresponds to the given detector element. Each difference value is determined by subtracting one of the multiple adjacent pixel values from the given pixel value.

The update parameter (also referred to as PAR) for a given detector channel can be calculated according to an expression given by $$PAR = \sum_{i=1}^{N} SIGN_{TH}(O - P_i) \quad (1)$$

wherein O represents the given pixel value, i is an index designating an i-th one of the multiple adjacent pixel values, $P_i$ represents an i-th one of the multiple adjacent pixel values, and N is the number of multiple adjacent pixel values. $SIGN_{TH}(O-P_i)$ is a function that has a value of +1 when $(O-P_i)$ is positive and satisfies $TH1 \leq |O- P_i| \leq TH2$, a value of $-1$ when $(O-P_i)$ is negative and satisfies $TH1 \leq |O-P_i| \leq TH2$, and a value of zero when $(O-P_i)$ does not satisfy $TH1 \leq |O-P_i| \leq TH2$. TH1 and TH2 are first and second threshold values, respectively. Thus, in contrast to a conventional "sign" function, the function $SIGN_{TH}$ is seen to be a thresholded "sign" function.

The first threshold value TH1 can be chosen to be approximately equal to a temporal noise level of the detector. The second threshold value TH2 can be chosen in the range of 2 times the temporal noise level to 2.5 times the temporal noise level. Determining the temporal noise level of a two-dimensional detector array is within the purview of one of ordinary skill in the art and does not require further discussion. For example, for an InSb-based detector array, a value of TH1 of approximately 1 count has been found advantageous, and a value of TH2 in the range of 2 to 2.5 counts has been found advantageous. As used in this regard, "approximately" refers a variation of about ±20% of the indicated value.

An exemplary kernel 300 of pixels that can be utilized in carrying out the calculation of the update parameter (PAR)

for a given detector channel shown in Equation 1 is illustrated in FIG. 3. As illustrated in FIG. 3, the exemplary kernel 300 is a 3×3 kernel of pixels comprising a central pixel O (the given pixel associated with the given detector element) and eight immediately adjacent pixels P1–P8. Thus, for the exemplary kernel 300, N=8 in Equation 1. Of course, the present invention is not limited to the use of 3×3 kernels in this regard and larger kernels can be used. It is preferable to kernels with an odd number of pixels, such as a 3×3 kernel, a 5×5 kernel and a 7×7 kernel, for example. It will be recognized that relatively larger kernels will act upon FPN of relatively larger frequency.

Moreover, although the kernel 300 illustrated in FIG. 3 is a an example of a "box" kernel (all 8 pixels surrounding a central pixel are considered), the present invention is not limited to box kernels, and kernels of other shapes, such as cross-shaped (X) kernels and plus-shaped (+) kernels for example, can be used.

The scene-based processor 108 also identifies offset coefficients whose existing values are to remain unchanged based upon the update parameters. For example, identifying offset coefficients whose existing values are to remain unchanged can comprise determining whether the update parameter (PAR) for the given detector element satisfies a condition given by TH3≦|PAR|≦TH4, wherein TH3 and TH4 are two threshold values, respectively, and, when PAR does not satisfy the condition TH3≦|PAR|≦TH4, designating the corresponding offset coefficient to remain unchanged. Where the update parameter (PAR) for a given detector element is evaluated over a 3×3 pixel region of pixel data centered about the given pixel, it will be apparent from Equation 1 that the update parameter (PAR) can range between −8 and +8. In an exemplary aspect, selecting TH3 from the range of 3 to 5 and selecting TH4 from the range of 6 to 7 has been found advantageous. For example, selecting TH3 to be 5 and TH4 to be 7 has been found to be advantageous in minimizing the effects of FPN. Alternatively, selecting TH3 to be 3 and TH4 to be 6 has also been found to be useful in minimizing the effects of FPN.

The image processing system 100 can comprise an optional null filter 118 for carrying out additional identification of offset coefficients whose values should not be changed. In this regard, the null filter identifies bordering detector elements that border detector elements whose offset coefficients are already designated to remain unchanged. The null filter 118 then designates the offset coefficients of the bordering detector elements to remain unchanged. This aspect can be useful for providing stability to the convergence attributes of the exemplary scene-based approach.

The image processing system 100 comprises an offset coefficient updater 110 for changing existing values of offset coefficients other than those identified to remain unchanged. In this regard, the offset coefficient updater 110 conditionally selects incrementing or decrementing the value of a given offset coefficient depending upon the sign of the update parameter. For example, the offset coefficient updater 110 decrements an existing value of a given offset coefficient designated to be changed when the corresponding update parameter (PAR) is positive. The offset coefficient updater 110 increments the existing value of a given offset coefficient designated to be changed when the corresponding update parameter (PAR) is negative. In an exemplary aspect, the incrementing and decrementing are done by a predetermined amount. The predetermined amount can be chosen, for example, in the range of 0.125 counts to 0.25 counts. A predetermined amount of 0.125 counts corresponds to changing the least significant bit of a stored digital value of an offset coefficient in an exemplary aspect. Of course, the predetermined amount is not limited to these values.

Moreover, the incrementing and decrementing can be carried out using variable amounts of change. For example, an amount of change of 4 counts could be chosen at the start of scene-based correction process, and the change amount can be gradually reduced (e.g., linearly or via any monotonically decreasing function) to a low value of 0.25 counts or 0.125 counts over a period of several seconds for a frame rate of 60 frames/sec, a typical value for FLIR devices.

The steps of correcting a frame of image data, calculating an update parameter for each detector element, identifying offset coefficients whose existing values are to remain unchanged, and changing existing values of offset coefficients other than those identified to remain unchanged can be repeated iteratively using successive frames of image data from the detector such that updated values of the offset coefficients converge to respective stable values. Moreover, optional frame integration and dead pixel replacement, described below, can also be repeated iteratively along with the above-noted steps.

The image processing system 100 can also comprise an optional frame integrator 112, with corresponding frame integration memory 114 and corresponding recursive frame updater 116, for applying frame integration to corrected image data from the image data correcter 106, such that the scene-based processor 108 receives frame-integrated data. In an exemplary aspect, frame integration comprises multiplying each pixel value of corrected image data produced from the image data correction by a first fractional number (f1) to provide first integration data and multiplying each pixel value of an existing frame of recursively processed image data by a second fractional number (f2) to provide second integration data. The first integration data and the second integration data are then added to provide frame-integrated data. Thus, frame-integrated data is provided to the scene-based processor 108, and calculating an update parameter is carried out using the frame-integrated data.

Using frame integration can be beneficial to enhance both the accuracy of the FPN correction and the stability of the convergence of corrected offset coefficients. In particular, one result of using frame integration is that the effective temporal noise level in frame-integrated data is dramatically reduced compared to the temporal noise level of the detector. The temporal noise level associated with frame integrated data has been found to be about 0.2 times the temporal noise level of the detector. Thus, when using a frame integrator 112, the first and second threshold values TH1 and TH2 can be substantially reduced. For example, when using a frame integrator 112, the value of TH1 can be chosen as approximately 0.2 times the temporal noise level of the detector (e.g., approximately 0.2 counts). Similarly, the value of TH2 can be chosen as approximately 0.4–0.5 times the temporal noise level of the detector (e.g., approximately 0.4–0.5 counts).

In an exemplary aspect, the first and second fractional numbers f1 and f2 can be chosen such that f2+f1=1. In addition, f2 can be selected in the range of 0.90 to 0.99. An advantageous range for f2 is 0.9 to 0.95. In this aspect, the value of f1 is determined by f2 according to f2+f1=1. Of course, the selections of f1 and f2 are not limited to these selections.

In an exemplary aspect, the existing frame of recursively processed image data is generated by successive iterations of processing successive frames of image data from the detector. In particular, the existing frame of recursively processed image data is generated by averaging successive frames of pixel data generated from the step of correcting during the iterations such that each successive stored frame of recursively processed image data is corrected using updated offset coefficients from an immediately preceding iteration. This latter aspect is reflected in FIG. 1 by the recursive frame updater 116, which is illustrated as receiving frame-integrated data from the frame integrater 112 as well as updated offset coefficients from the offset coefficient updater 110, such that the recursive frame updater can apply the most recent offset coefficient correction (from an immediately previous iteration) to frame-integrated data (from the present iteration). This resulting recursively processed image data is then provided back to the frame integrator 112 and stored in the frame integration memory 114 to be utilized during the next iteration.

The image processing system 100 can also comprise an optional power-up correcter 128 for carrying out an initial correction of offset coefficients. The initial power-up correction can be carried out, for example, by analyzing data received by the detector from a predetermined thermal source (not shown). The predetermined thermal source can be, for example, a bland source with a substantially uniform spatial structure and a smooth surface as well as a spatially uniform temperature. Alternatively, the power-up correction can be carried out by applying scene-based processing, such as that described herein, to a defocused scene image received by the detector. In the former case, the power-up correcter comprises a controller for instructing a mechanism to selectively place the predetermined thermal source in a position such that the detector can receive radiation emitted by the predetermined thermal source and for instructing the detector to collect the appropriate data. The data received is first corrected by the image data correcter 106 using factory-calibrated values of correction coefficients, and the values of the offset coefficients are then modified to achieve a uniform overall response. In the latter case, the power-up correcter 128 comprises a controller for instructing a focus mechanism to defocus appropriate optics to provide a defocused image of the scene to the detector such that scene-based processing, such as that described herein, can be carried out using the defocused image. Additional details pertaining to exemplary power-up corrections are disclosed in commonly assigned U.S. patent application Ser. No. 09/840,920 "Scene-based Non-uniformity Correction For Detector Arrays", the disclosure of which is hereby incorporated herein by reference in its entirety.

The image processing system 100 can also comprise an optional dead pixel replacer 120 inserted functionally after the image data correcter 106. Dead pixel replacement is known to those skilled in the art and includes identifying dead pixels (e.g., on the basis of signals therefrom that are consistently too high or too low in comparison to other detector pixels) and replacing the dead pixel with the average of its immediately neighboring pixels.

The image processing system 100 can also comprise an optional dynamic range compressor 122 for compressing a dynamic range of data input thereto and an optional edge enhancement filter 126 for enhancing edges in data input thereto. Approaches for dynamic range compression and edge enhancement are known to those skilled in the art. Exemplary approaches for dynamic range compression and edge enhancement are disclosed in commonly assigned U.S. patent application Ser. No. 09/841,081 "Dynamic Range Compression", the disclosure of which is hereby incorporated herein in its entirety.

The image processing system 100 can also comprise an extended range processor 124 for increasing a distance range over which data can be gathered and effectively processed by the image processing system 100. An exemplary approach for extended range processing is disclosed in commonly assigned U.S. patent application Ser. No. 09/841,079 "Extended Range Image Processing for Electro-Optical Systems", the disclosure of which is hereby incorporated herein in its entirety. Though the dynamic range compressor 112, the extended range processor 124 and the edge enhancement filter 126 are shown in a particular function order, the order of these elements is not restricted to such, and their order can be interchanged as desired.

As illustrated in FIG. 1, output image data is generated by the edge enhancement filter 126. This output image data can be displayed on a display (not shown), such a pilot's display in an airborne platform, and/or stored in a memory device (not shown). Of course, if the dead pixel replacer 120, the dynamic range compressor 112, the extended range processor 124 and the edge enhancement filter 126 are not provided, the output image data will be generated directly by the image data correcter 106.

The invention as described above has advantages over conventional scene-based systems for providing updated offset coefficients. For example, utilizing first and second threshold values TH1 and TH2 as described above in relation to Equation 1, and choosing values of TH1 and TH2 in relation to the temporal noise level allows the image processing system 100 to be more efficient in correcting FPN. In particular, by choosing TH1 to be approximately equal to the temporal noise level of the detector and by using the thresholded "sign" function, $SIGN_{TH}$, in Equation 1, the value of PAR is not affected by differences between adjacent pixels at or below the temporal noise level. Thus, the image processing system 100 largely avoids attempting to calculate updated offset coefficients based upon difference values that result merely from temporal noise. In addition, by choosing TH2 to be approximately 2–2.5 times the temporal noise level, the value of PAR in Equation 1 is not affected by large difference values that can likely be associated with scene content. Thus, the image processing system 100 largely avoids memorizing scene content when calculating updated offset coefficients.

In addition, the utilization of the third and fourth threshold values TH3 and TH4 further enhances efficiency of the image processing system 100. In particular, by choosing the value of TH4 to be somewhat less than the maximum value that the update parameter PAR can attain (e.g., in the example of FIG. 3, PAR can attain maximum positive and negative values of +8 and –8, whereas advantageous values of TH4 are noted as 6 and 7), the image processing system 100 avoids changing an offset coefficient when PAR attains large positive and negative values, which may be indicative of strong scene content or a problem with a detector element. Further, by utilizing a value of TH3 somewhat greater than 1 or 2 (e.g, values of 3 to 5), the image processing system 100 avoids changing an offset coefficient based upon a low value of PAR that may be less indicative of fixed pattern noise than a somewhat higher value of PAR.

Further, it will be recognized that the present invention has additional advantages compared to conventional approaches. For example, the present invention is able to provide superior non-uniformity correction of imagery without requiring motion of a scene imagery relative to a scanning detector array (and, hence, without requiring complicated dithering mechanisms). In addition, the present invention does not require repeated blurring of scene imagery.

Additional description of the invention will now be provided with reference to FIGS. 4–8 and 9A–9D.

Figure 4:
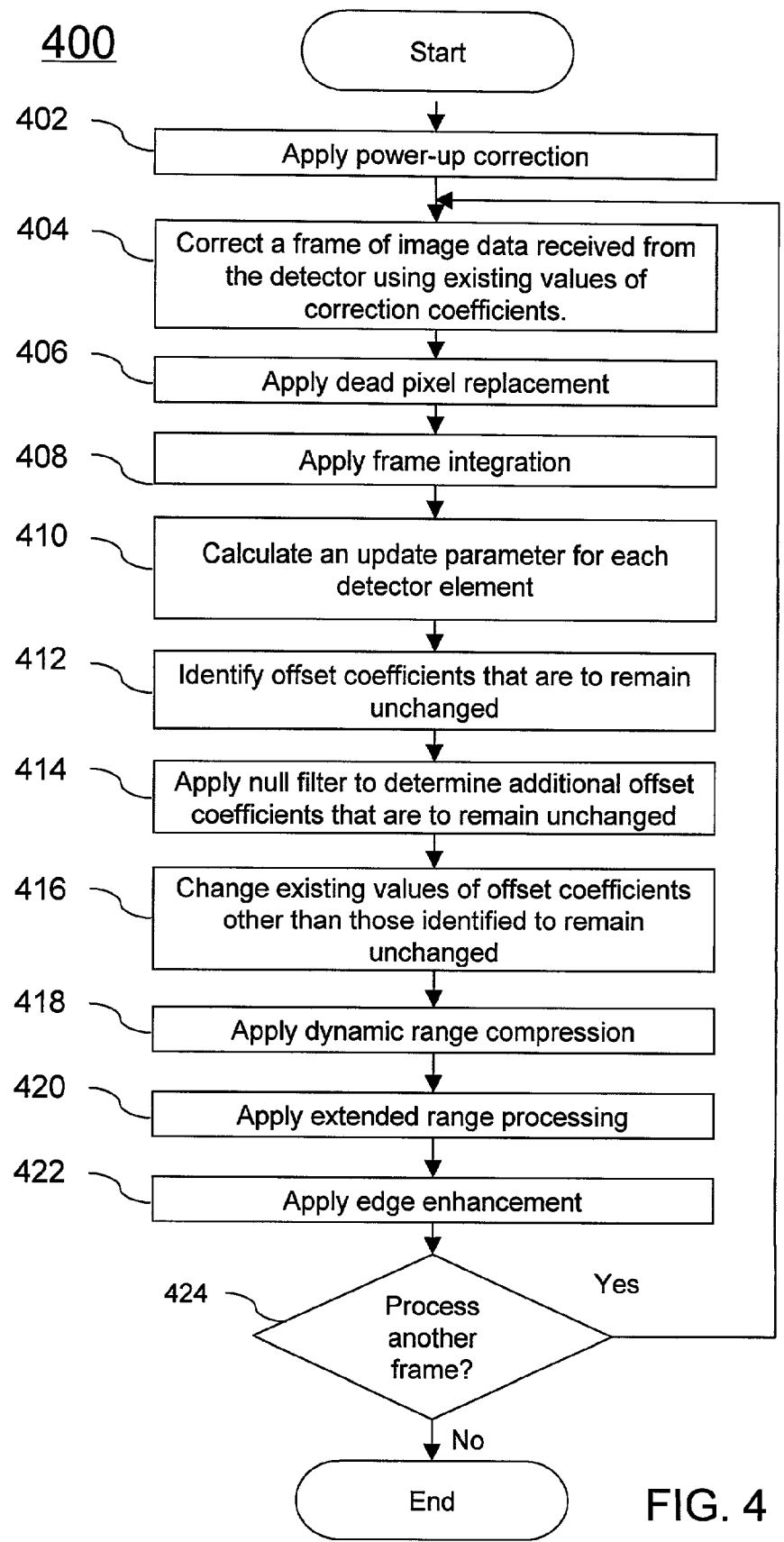
FIG. 4 is a flow diagram illustrating an approach for non-uniformity correction according to an exemplary aspect of the present invention.

FIG. 4 is a flow diagram of an exemplary method 400 of processing image data received from a detector having a plurality of detector elements arranged in a two-dimensional array. The method 400 can comprise an optional step of applying a power-up correction to generate an initial correction to offset coefficients (step 402), such as described previously with reference to FIG. 1. In addition, the method 400 comprises correcting a frame of image data received from the detector using existing values of a set of correction coefficients, wherein the set of correction coefficients comprises a plurality of offset coefficients corresponding to the plurality of detector elements (step 404). Of course, as noted previously, the set of correction coefficients can also comprise moment and gain coefficients, and it is advantageous to utilize these coefficients for corrected image data.

In addition, the method 400 can comprise an optional steps of dead pixel replacement (step 406) and applying frame integration (step 408), such as described previously. Further, the method 400 comprises calculating an update parameter for each detector element using pixel data generated from said step of correcting a frame of image data, wherein the update parameter for a given detector element is calculated based upon multiple difference values determined from a given pixel value of the pixel data and multiple adjacent pixel values of the pixel data (step 410). The given pixel value corresponds to the given detector element, and each difference value is determined by subtracting one of the multiple adjacent pixel values from the given pixel value.

As noted previously, in an exemplary aspect, the update parameter (PAR) for a given detector element can be calculated according to an expression given by $$PAR = \sum_{i=1}^{N} SIGN_{TH}(O - P_i)$$

where O represents the given pixel value, i is an index designating an i-th one of the multiple adjacent pixel values, $P_i$ represents an i-th one of the multiple adjacent pixel values, and N is the number of multiple adjacent pixel values. $SIGN_{TH}(O-P_i)$ is a function that has a value of +1 when $(O-P_i)$ is positive and satisfies $TH1 \leq |O-P_i| \leq TH2$, a value of −1 when $(O-P_i)$ is negative and satisfies $TH1 \leq |O-P_i| \leq TH2$, and a value of zero when $(O-P_i)$ does not satisfy $TH1 \leq |O-P_i| \leq TH2$, wherein TH1 and TH2 are first and second threshold values, respectively. Appropriate choices for TH1 and TH2 have been described previously.

In addition, the method 400 comprises identifying offset coefficients whose existing values are to remain unchanged based upon the update parameters (step 412). The method 400 can comprise an optional step of applying a null filter to determine additional offset coefficients that are to remain unchanged (step 414). The method 400 comprises changing existing values of offset coefficients other than those identified to remain unchanged (step 416). The method 400 can also comprise optional steps of applying dynamic range compression (step 418), applying extended range processing (420), and applying edge enhancement (step 422). The method 400 can comprise a decision step (step 424) wherein it is determined whether additional frames of data are to be processed. If yes, the process returns to step 404. In this way, steps 404, 410, 412, and 416, as well as any optional steps that are chosen, can be repeated iteratively using successive frames of image data from the detector such that updated values of the offset coefficients converge to respective stable values.

It should be noted that various steps illustrated in FIG. 4 need not be carried out in the particular order indicated. For example, the order of optional steps 418–422 can be interchanged as desired.

Figure 5:
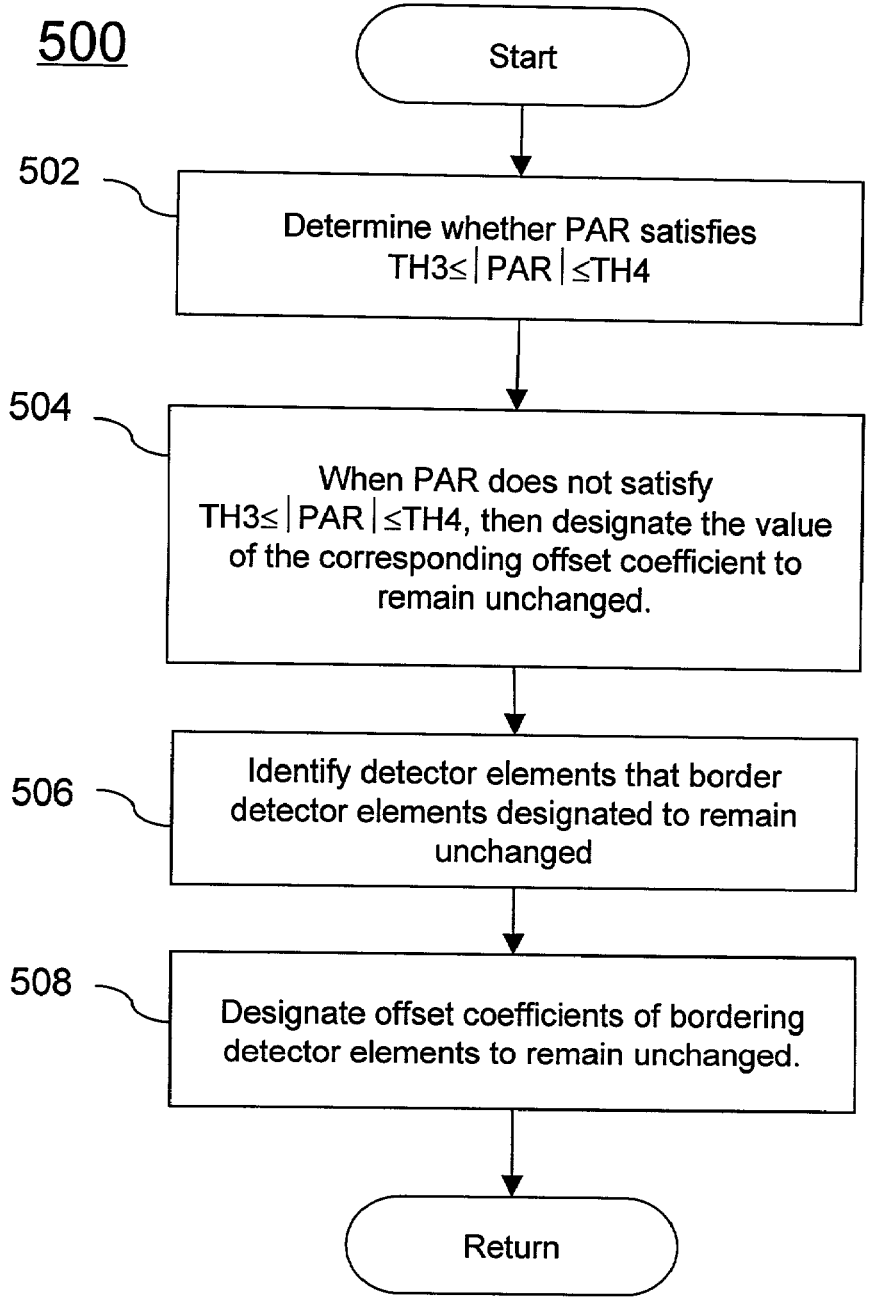
FIG. 5 is a flow diagram illustrating an approach for identifying offset coefficients whose existing values are to remain unchanged according to an exemplary aspect of the present invention.

FIG. 5 is a flow diagram of an exemplary method 500 for identifying offset coefficients whose existing values are to remain unchanged that can be carried out in accordance with exemplary method 400 illustrated in FIG. 4. The method 500 comprises determining whether the update parameter (PAR) for the given detector element satisfies a condition given by $TH3 \leq |PAR| \leq TH4$, wherein TH3 and TH4 are two threshold values (e.g., third and fourth threshold values), respectively (step 502). The method 500 comprises designating the corresponding offset coefficient to remain unchanged when PAR does not satisfy the condition $TH3 \leq |PAR| \leq TH4$ (step 504). In addition, the method 500 can optionally comprise identifying bordering detector elements that border detector elements whose offset coefficients are already designated to remain unchanged (step 506) and designating offset coefficients of the bordering detector elements to remain unchanged (step 508). In this regard, steps 506 and 508 correspond to step 408 of FIG. 4. Appropriate choices for TH3 and TH4 have been previously described.

Figure 6:
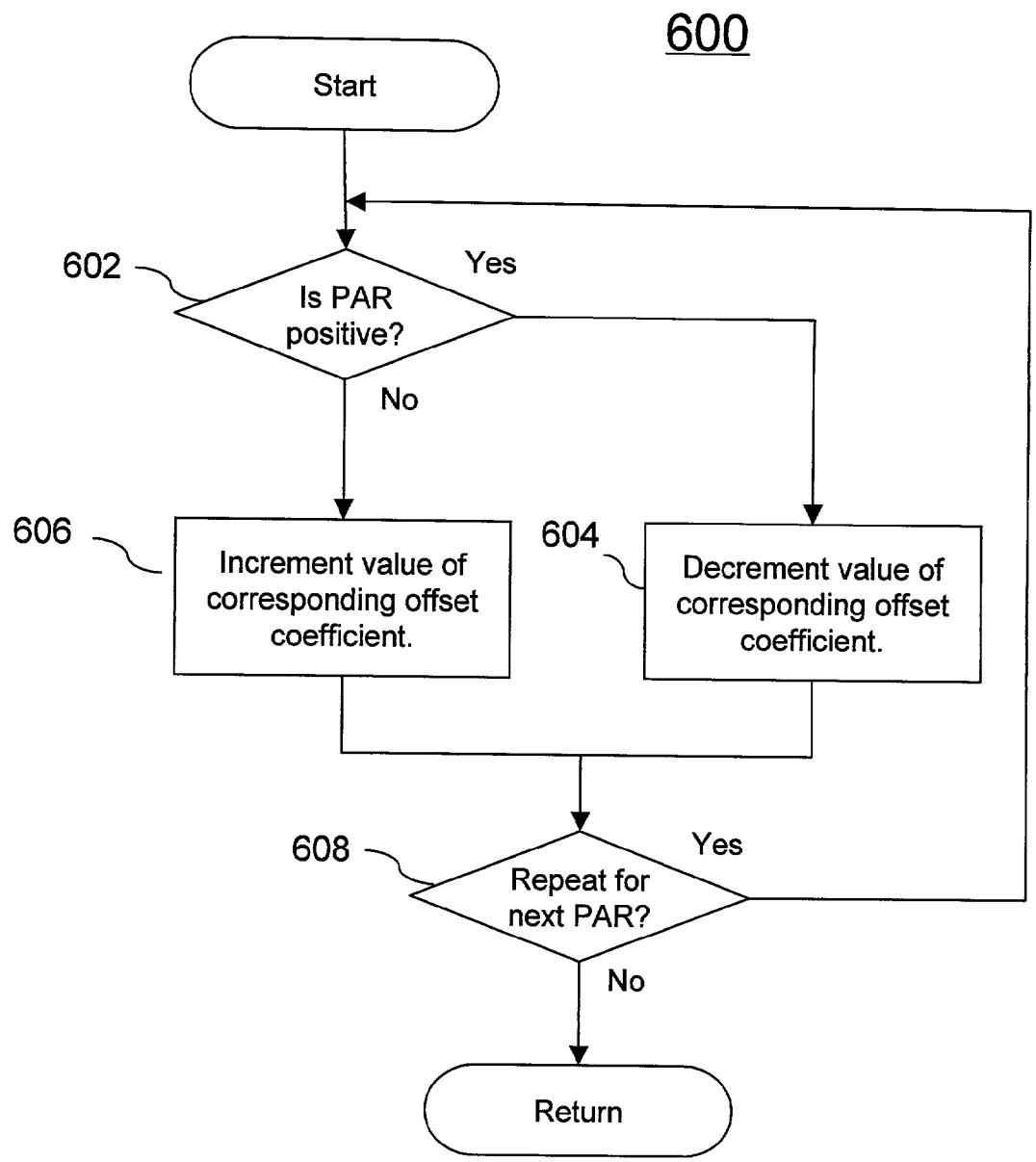
FIG. 6 is a flow diagram illustrating an approach for changing selected offset coefficients according to an exemplary aspect of the present invention.

FIG. 6 is a flow diagram of an exemplary method 600 for changing existing values of offset coefficients other than those that are to remain unchanged that can be carried out in accordance with exemplary method 400 illustrated in FIG. 4. The method 600 comprises an action conditionally selected from decrementing an existing value of an offset coefficient to be changed (step 604) when the corresponding update parameter (PAR) is positive (step 602) and incrementing the existing value of an offset coefficient to be changed (step 606) when the corresponding update parameter (PAR) is negative (step 602). The method 600 can also include a decision step (step 608) for determining whether steps 602–606 should be repeated for a next update parameter. If yes, the process returns to step 602. As noted previously, the incrementing and decrementing can be done using a predetermined amount, appropriate selections of which have been previously described.

Figure 7:
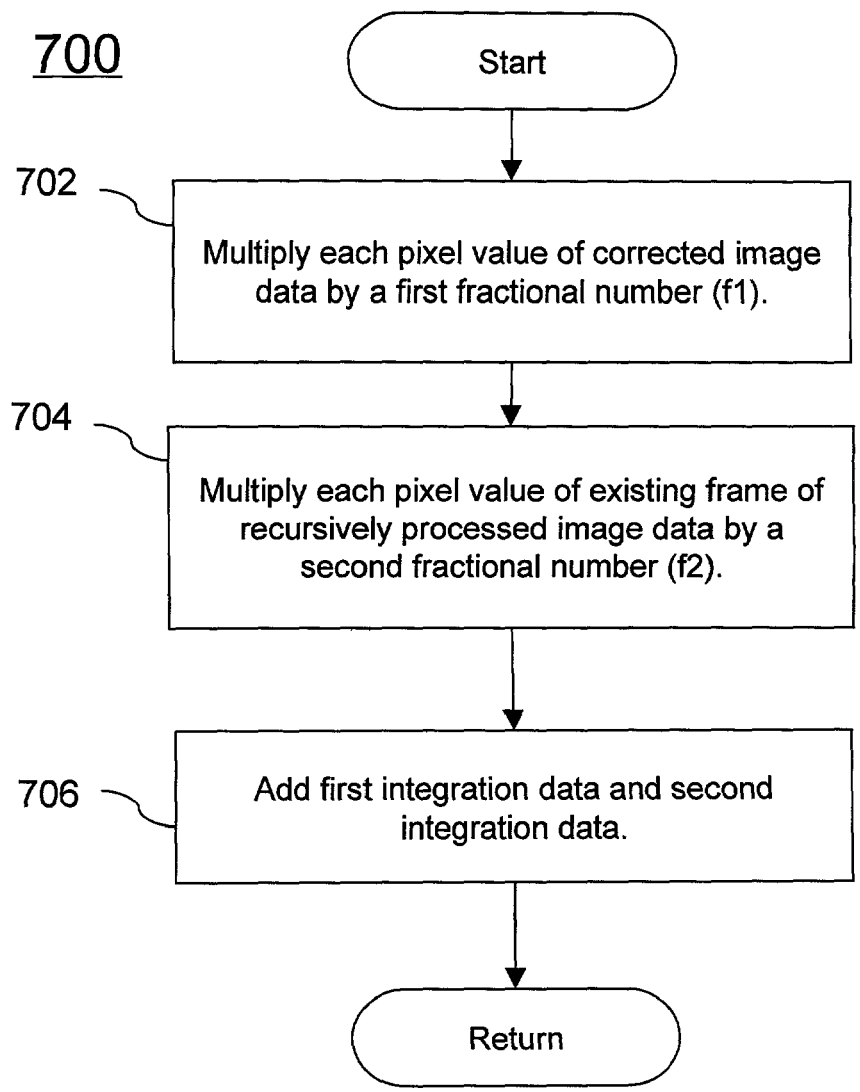
FIG. 7 is a flow diagram illustrating an approach for frame integration according to an exemplary aspect of the present invention.

FIG. 7 is a flow diagram of an exemplary method 700 for applying optional frame integration that can be carried out in accordance with exemplary method 400 illustrated in FIG. 4. The method 700 comprises multiplying each pixel value of corrected image data produced from said correcting by a first fractional number (f1) to provide first integration data (step 702) and multiplying each pixel value of an existing frame of recursively processed image data by a second fractional number (f2) to provide second integration data (step 704). The method 700 comprises adding the first integration data and the second integration data to provide frame-integrated data (step 706). The frame integrated data can then be used to calculate an update parameter in accordance with the method 400 illustrated in FIG. 4. Appropriate selections for f1 and f2, and potential modifications to values of TH1 and TH2 when frame integration is used, have been described previously.

Figure 8:
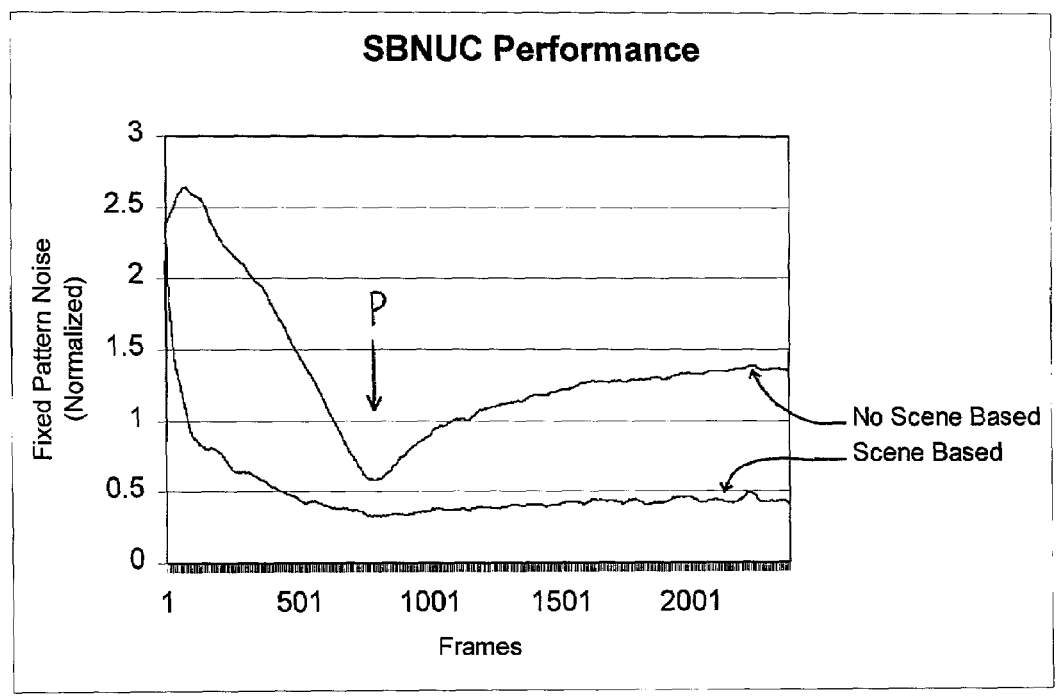
FIG. 8 is a graph comparing test data of fixed pattern noise associated with a two-dimensional detector utilized in a FLIR wherein imagery is processed with and without scene-based processing according to an exemplary implementation of the present invention.

FIG. 8 is a graph comparing test data of FPN associated with a two-dimensional detector utilized in a FLIR wherein imagery was processed with and without scene-based processing according to an exemplary implementation of the present invention. The data have been normalized to the temporal noise content of the detector (assumed to be approximately 1 count in this example). It was desired to reduce the FPN to one-half the temporal noise by providing corrected offset coefficients using scene-based approach according to an exemplary aspect of the invention. As illustrated in FIG. 8, this goal was achieved in less than 500 frames, or less than 10 seconds for a 60-Hertz FLIR. In contrast, the FPN noise data obtained without using a scene-based approach according to the present invention did not drop below the temporal noise level. A dip in the FPN data is observed at point P in the FPN data generated with no scene-based correction. This dip is associated with a recalibration of the detector carried out using a bland thermal source (also known as a "one-touch correction"). As can be seen from FIG. 8, the FPN data obtained without scene-based correction gradually increases following the one-touch correction at point P.

Figures 9A, 9B, 9C, 9D:
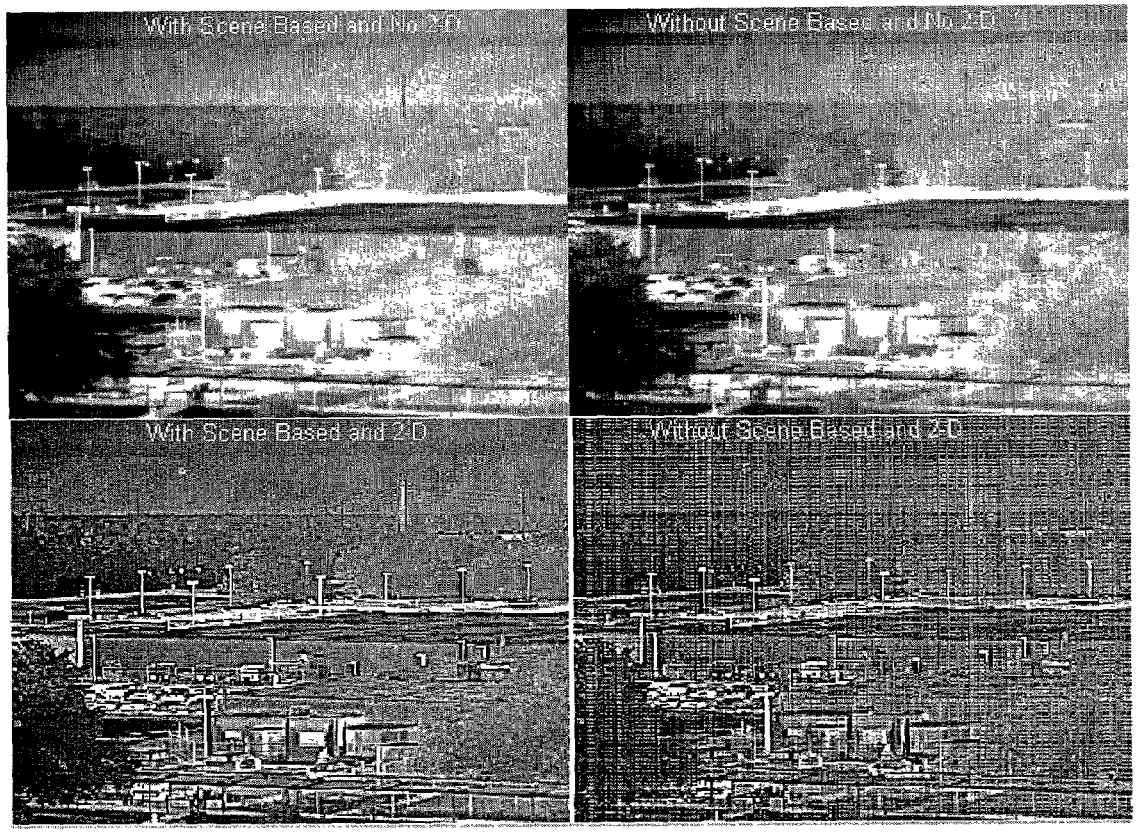
FIGS. 9A–9D illustrate test imagery processed with/without scene-based processing and with/without 2-D edge enhancement according to an exemplary implementation the present invention.

FIGS. 9A–9D illustrate test imagery obtained with and without scene-based processing according to the present invention and with and without edge enhancement. FIG. 9A shows imagery obtained without scene-based correction and without edge enhancement. FIG. 9B shows imagery processed without scene-based correction but with edge enhancement. FIG. 9C shows imagery processed with scene-based correction according to the present invention and without edge enhancement. FIG. 9D shows imagery processed with scene-based correction according to the present invention and with edge enhancement. It is evident that the imagery in FIGS. 9C and 9D processed with scene-based correction according to the present invention are substantially superior to corresponding imagery processed without with scene-based correction according to the present invention.

It should be noted that the terms "comprises" and "comprising", when used in this specification, are taken to specify the presence of stated features, integers, steps or components; but the use of these terms does not preclude the presence or addition of one or more other features, integers, steps, components or groups thereof.

The invention has been described with reference to particular embodiments. However, it will be readily apparent to those skilled in the art that it is possible to embody the invention in specific forms other than those of the embodiments described above. This can be done without departing from the spirit of the invention. The embodiments described herein are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of processing image data received from a detector having a plurality of detector elements arranged in a two-dimensional array, the method comprising the steps of:

correcting a frame of image data received from the detector using existing values of a set of correction coefficients, the set of correction coefficients comprising a plurality of offset coefficients corresponding to the plurality of detector elements;

calculating an update parameter for each detector element using pixel data generated from said step of correcting, wherein the update parameter for a given detector element is calculated based upon multiple difference values determined from a given pixel value of the pixel data and multiple adjacent pixel values of the pixel data, the given pixel value corresponding to the given detector element, each difference value being determined by subtracting one of the multiple adjacent pixel values from the given pixel value;

identifying offset coefficients whose existing values are to remain unchanged based upon the update parameters; and changing existing values of offset coefficients other than those identified to remain unchanged, wherein offset coefficients whose values are to be changed are determined by comparing the update parameters with threshold values, and by using a polarity of the update parameters.

2. The method of claim 1, wherein the steps of correcting a frame of image data, calculating an update parameter for each detector element, identifying offset coefficients whose existing values are to remain unchanged, and changing existing values of offset coefficients other than those identified to remain unchanged are repeated iteratively using successive frames of image data from the detector such that updated values of the offset coefficients converge to respective stable values.

3. The method of claim 1, wherein the update parameter (PAR) for a given detector element is calculated according to an expression given by $$PAR = \sum_{i=1}^{N} SIGN_{TH}(O - P_i)$$

wherein

O represents the given pixel value, i is an index designating an i-th one of the multiple adjacent pixel values, $P_i$ represents an i-th one of the multiple adjacent pixel values, N is the number of multiple adjacent pixel values, and $SIGN_{TH}(O-P_i)$ is a function that has a value of +1 when $(O-P_i)$ is positive and satisfies $TH1 \leq |O-P_i| \leq TH2$, −1 when $(O-P_i)$ is negative and satisfies $TH1 \leq |O-P_i| \leq TH2$, and zero when $(O-P_i)$ does not satisfy $TH1 \leq |O-P_i| \leq TH2$, wherein TH1 and TH2 are first and second threshold values, respectively.

4. The method of claim 3, wherein the step of identifying comprises:

designating offset coefficients whose existing values are to remain unchanged as those whose corresponding update parameter (PAR) does not satisfy $TH3 \leq |PAR| \leq TH4$, wherein TH3 and TH4 are third and fourth threshold values, respectively.

5. The method of claim 4, comprising applying frame integration after the step of correcting, wherein applying frame integration comprises:

multiplying each pixel of corrected image data produced from said correcting by a first fractional number to provide first integration data;

multiplying each pixel of a stored frame of recursively processed image data by a second fractional number to provide second integration data; and adding the first integration data and the second integration data to provide frame-integrated data, wherein the step of calculating an update parameter is carried out using the frame-integrated data.

6. The method of claim 5, wherein the step of identifying comprises:

15 identifying bordering detector elements that border detector elements whose offset coefficients are already designated to remain unchanged; and designating offset coefficients of the bordering detector elements to remain unchanged.

7. The method of claim 6, wherein the step of changing comprises an action conditionally selected from:

decrementing an existing value of an offset coefficient to be changed when the corresponding update parameter (PAR) is positive; and incrementing the existing value of an offset coefficient to be changed when the corresponding update parameter (PAR) is negative.

8. The method of claim 7, wherein said incrementing and decrementing comprise incrementing and decrementing by a predetermined amount.

9. The method of claim 7, wherein N=8 and wherein the multiple adjacent pixel values comprise eight pixels immediately adjacent to the given pixel such that the given pixel and the multiple adjacent pixels form a 3×3 set of pixels.

10. The method of claim 3, wherein TH1 is approximately equal to a temporal noise level of the detector.

11. The method of claim 10, wherein TH2 is in the range of 2 times the temporal noise level to 2.5 times the temporal noise level.

12. The method of claim 3, wherein TH1 is approximately 1 count.

13. The method of claim 12, wherein TH2 is in the range of 2 to 2.5 counts.

14. The method of claim 3, wherein the step of identifying comprises:

determining whether the update parameter (PAR) for the given detector element satisfies a condition given by TH3≦|PAR|≦TH4, wherein TH3 and TH4 are two threshold values, respectively; and when PAR does not satisfy the condition TH3≦|PAR|≦TH4, designating the corresponding offset coefficient to remain unchanged.

15. The method of claim 14, wherein the step of identifying comprises:

identifying bordering detector elements that border detector elements whose offset coefficients are already designated to remain unchanged; and designating offset coefficients of the bordering detector elements to remain unchanged.

16. The method of claim 14, wherein the update parameter (PAR) for a given detector element is evaluated over a 3×3 pixel region of the pixel data centered about the given pixel;

the update parameter (PAR) can range between −8 and +8;

TH3 is selected from the range of 3 to 5; and

TH4 is selected from the range of 6 to 7.

17. The method claim 16, wherein TH3 is 5 and TH4 is 7.

18. The method of claim 1, comprising applying frame integration after the step of correcting, wherein applying frame integration comprises:

multiplying each pixel value of corrected image data produced from said correcting by a first fractional number (f1) to provide first integration data;

multiplying each pixel value of an existing frame of recursively processed image data by a second fractional number (f2) to provide second integration data; and adding the first integration data and the second integration data to provide frame-integrated data, wherein the step of calculating an update parameter is carried out using the frame-integrated data.

19. The method of claim 18, wherein f2+f1=1.

20. The method of claim 19, wherein f2 is selected from the range of 0.90 to 0.99.

21. The method of claim 18, wherein the existing frame of recursively processed image data is generated by successive iterations of processing successive frames of image data from the detector, and wherein the existing frame of recursively processed image data is generated by averaging successive frames of pixel data generated from the step of correcting during the iterations such that each successive stored frame of recursively processed image data is corrected using updated offset coefficients from an immediately preceding iteration.

22. An image processing system for processing image data received from a detector having a plurality of detector elements arranged in a two dimensional array, comprising:

a memory; and a processing unit coupled to the memory, wherein the processing unit is programmed to carry out steps of:

correcting a frame of image data received from the detector using existing values of a set of correction coefficients, the set of correction coefficients comprising a plurality of offset coefficients corresponding to the plurality of detector elements, calculating an update parameter for each detector element using pixel data generated from said step of correcting, wherein the update parameter for a given detector element is calculated based upon multiple difference values determined from a given pixel value of the pixel data and multiple adjacent pixel values of the pixel data, the given pixel value corresponding to the given detector element, each difference value being determined by subtracting one of the multiple adjacent pixel values from the given pixel value, identifying offset coefficients whose existing values are to remain unchanged based upon the update parameters, and changing existing values of offset coefficients other than those identified to remain unchanged, wherein offset coefficients whose values are to be changed are determined by comparing the update parameters with threshold values, and by using a polarity of the update parameters.

23. The image processing system of claim 22, wherein the processing unit iteratively repeats the steps of correcting a frame of image data, calculating an update parameter for each detector element, identifying offset coefficients whose existing values are to remain unchanged, and changing existing values of offset coefficients other than those identified to remain unchanged using successive frames of image data from the detector such that updated values of the offset coefficients converge to respective stable values.

24. The image processing system of claim 22, wherein the update parameter (PAR) for a given detector element is calculated according to an expression given by $$PAR = \sum_{i=1}^{N} \text{SIGN}_{TH}(O - P_i)$$

wherein

O represents the given pixel value, i is an index designating an i-th one of the multiple adjacent pixel values, $P_i$ represents an i-th one of the multiple adjacent pixel values, N is the number of multiple adjacent pixel values, and $SIGN_{TH}(O-P_i)$ is a function that has a value of +1 when $(O-P_i)$ is positive and satisfies $TH1 \leq |O-P_i| \leq TH2$, −1 when $(O-P_1)$ is negative and satisfies $TH1 \leq |O-P_i| \leq TH2$, and zero when $(O-P_i)$ does not satisfy $TH1 \leq |O-P_i| \leq TH2$, wherein TH1 and TH2 are first and second threshold values, respectively.

25. The image processing system of claim 24, wherein the processing unit carries out the step of identifying by:
designating offset coefficients whose existing values are to remain unchanged as those whose corresponding update parameter (PAR) does not satisfy $TH3 \leq |PAR| \leq TH4$, wherein TH3 and TH4 are third and fourth threshold values, respectively.

26. The image processing system of claim 25, wherein the processing unit applies frame integration after the step of correcting by:
multiplying each pixel of corrected image data produced from said correcting by a first fractional number to provide first integration data;
multiplying each pixel of a stored frame of recursively processed image data by a second fractional number to provide second integration data; and
adding the first integration data and the second integration data to provide frame-integrated data,
wherein the processing unit calculates the update parameter using the frame-integrated data.

27. The image processing system of claim 26, wherein the processing unit carries out the step of identifying by:
identifying bordering detector elements that border detector elements whose offset coefficients are already designated to remain unchanged; and
designating offset coefficients of the bordering detector elements to remain unchanged.

28. The image processing system of claim 27, wherein the processing unit carries out the step of changing by executing an action conditionally selected from:
decrementing an existing value of an offset coefficient to be changed when the corresponding update parameter (PAR) is positive; and
incrementing the existing value of an offset coefficient to be changed when the corresponding update parameter (PAR) is negative.

29. The image processing system of claim 28, wherein said incrementing and decrementing comprise incrementing and decrementing by a predetermined amount.

30. The image processing system of claim 28, wherein N=8 and wherein the multiple adjacent pixel values comprise eight pixels immediately adjacent to the given pixel such that the given pixel and the multiple adjacent pixels form a 3×3 set of pixels.

31. The image processing system of claim 24, wherein TH1 is approximately equal to a temporal noise level of the detector.

32. The image processing system of claim 31, wherein TH2 is in the range of 2 times the temporal noise level to 2.5 times the temporal noise level.

33. The image processing system of claim 24, wherein TH1 is approximately 1 count.

34. The image processing system of claim 33, wherein TH2 is in the range of 2 to 2.5 counts.

35. The image processing system of claim 24, wherein the processing unit carries out the step of identifying by:
determining whether the update parameter (PAR) for the given detector element satisfies a condition given by $TH3 \leq |PAR| \leq TH4$, wherein TH3 and TH4 are two threshold values, respectively; and
when PAR does not satisfy the condition $TH3 \leq |PAR| \leq TH4$, designating the corresponding offset coefficient to remain unchanged.

36. The image processing system of claim 35, wherein the processing unit carries out the step of identifying by:
identifying bordering detector elements that border detector elements whose offset coefficients are already designated to remain unchanged; and
designating offset coefficients of the bordering detector elements to remain unchanged.

37. The image processing system of claim 35, wherein
the update parameter (PAR) for a given detector element is evaluated over a 3×3 pixel region of the pixel data centered about the given pixel;
the update parameter (PAR) can range between −8 and +8;
TH3 is selected from the range of 3 to 5; and
TH4 is selected from the range of 6 to 7.

38. The image processing system claim 37, wherein TH3 is 5 and TH4 is 7.

39. The image processing system of claim 22, wherein the processing unit applies frame integration after the step of correcting by:
multiplying each pixel value of corrected image data produced from said correcting by a first fractional number (f1) to provide first integration data;
multiplying each pixel value of an existing frame of recursively processed image data by a second fractional number (f2) to provide second integration data; and
adding the first integration data and the second integration data to provide frame-integrated data,
wherein the processing unit calculates the update parameter using the frame data.

40. The image processing system of claim 39, wherein f2+f1=1.

41. The image processing system of claim 40, wherein f2 is selected from the range of 0.90 to 0.99.

42. The image processing system of claim 39, wherein the processing unit generates the existing frame of recursively processed image data from successive iterations of processing successive frames of image data from the detector, wherein the existing frame of recursively processed image data is generated by averaging successive frames of pixel data generated from the step of correcting during the iterations such that each successive stored frame of recursively processed image data is corrected using updated offset coefficients from an immediately preceding iteration.

43. A computer-readable carrier containing a computer program adapted to cause a computer to execute steps of:
correcting a frame of image data received from a detector having a plurality of detector elements using existing values of a set of correction coefficients, the set of correction coefficients comprising a plurality of offset coefficients corresponding to the plurality of detector elements;
calculating an update parameter for each detector element using pixel data generated from said step of correcting, wherein the update parameter for a given detector element is calculated based upon multiple difference values determined from a given pixel value of the pixel data and multiple adjacent pixel values of the pixel data, the given pixel value corresponding to the given detector element, each difference value being determined by subtracting one of the multiple adjacent pixel values from the given pixel value;

identifying offset coefficients whose existing values are to remain unchanged based upon the update parameter; and changing existing values of offset coefficients other than those identified to remain unchanged, wherein offset coefficients whose values are to be changed are determined by comparing the update parameters with threshold values, and by using a polarity of the update parameters.

44. The computer-readable carrier of claim 43, wherein the computer-readable carrier is adapted to cause the computer to iteratively repeat the steps of correcting a frame of image data, calculating an update parameter for each detector element, identifying offset coefficients whose existing values are to remain unchanged, and changing existing values of offset coefficients other than those identified to remain unchanged using successive frames of image data from the detector such that updated values of the offset coefficients converge to respective stable values.

45. The computer-readable carrier of claim 43, wherein the update parameter (PAR) for a given detector element is calculated according to an expression given by $$PAR = \sum_{i=1}^{N} SIGN_{TH}(O - P_i)$$

wherein

O represents the given pixel value, i is an index designating an i-th one of the multiple adjacent pixel values, $P_i$ represents an i-th one of the multiple adjacent pixel values, N is the number of multiple adjacent pixel values, and $SIGN_{TH}(O-P_1)$ is a function that has a value of +1 when (O−P) is positive and satisfies $TH1 \leq |O-P_i| \leq TH2$, −1 when (O−$P_i$) is negative and satisfies $TH1 \leq |O-P_i| \leq TH2$, and zero when (O−$P_i$) does not satisfy $TH1 \leq |O-P_i| \leq TH2$, wherein TH1 and TH2 are first and second threshold values, respectively.

46. The computer-readable carrier of claim 45, wherein the computer-readable carrier is adapted to cause the computer to execute the step of identifying by:

designating offset coefficients whose existing values are to remain unchanged as those whose corresponding update parameter (PAR) does not satisfy $TH3 \leq |PAR| \leq TH4$, wherein TH3 and TH4 are third and fourth threshold values, respectively.

47. The computer-readable carrier of claim 46, wherein the computer-readable carrier is adapted to cause the computer to apply frame integration after the step of correcting by:

multiplying each pixel of corrected image data produced from said correcting by a first fractional number to provide first integration data;

multiplying each pixel of a stored frame of recursively processed image data by a second fractional number to provide second integration data; and adding the first integration data and the second integration data to provide frame-integrated data, wherein the computer-readable carrier is adapted cause the computer to calculate the update parameter using the frame-integrated data.

48. The computer-readable carrier of claim 47, wherein the computer-readable carrier is adapted to cause the computer to execute the step of identifying by:

identifying bordering detector elements that border detector elements whose offset coefficients are already designated to remain unchanged; and designating offset coefficients of the bordering detector elements to remain unchanged.

49. The computer-readable carrier of claim 48, wherein the computer-readable carrier is adapted to cause the computer to carry out the step of changing by executing an action conditionally selected from:

decrementing an existing value of an offset coefficient to be changed when the corresponding update parameter (PAR) is positive; and incrementing the existing value of an offset coefficient to be changed when the corresponding update parameter (PAR) is negative.

50. The computer-readable carrier of claim 49, wherein said incrementing and decrementing comprise incrementing and decrementing by a predetermined amount.

51. The computer-readable carrier of claim 49, wherein N=8 and wherein the multiple adjacent pixel values comprise eight pixels immediately adjacent to the given pixel such that the given pixel and the multiple adjacent pixels form a 3×3 set of pixels.

52. The computer-readable carrier of claim 45, wherein TH1 is approximately equal to a temporal noise level of the detector.

53. The computer-readable carrier of claim 52, wherein TH2 is in the range of 2 times the temporal noise level to 2.5 times the temporal noise level.

54. The computer-readable carrier of claim 45, wherein TH1 is approximately 1 count.

55. The computer-readable carrier of claim 54, wherein TH2 is in the range of 2 to 2.5 counts.

56. The computer-readable carrier of claim 45, wherein the computer-readable carrier is adapted cause the computer to execute the step of identifying by:

determining whether the update parameter (PAR) for the given detector element satisfies a condition given by $TH3 \leq |PAR| \leq TH4$, wherein TH3 and TH4 are two threshold values, respectively; and when PAR does not satisfy the condition $TH3 \leq |PAR| \leq TH4$, designating the corresponding offset coefficient to remain unchanged.

57. The computer-readable carrier of claim 56, wherein the computer-readable carrier is adapted to cause the computer to execute the step of identifying by:

identifying bordering detector elements that border detector elements whose offset coefficients are already designated to remain unchanged; and designating offset coefficients of the bordering detector elements to remain unchanged.

58. The computer-readable carrier of claim 56, wherein the update parameter (PAR) for a given detector element is evaluated over a 3×3 pixel region of the pixel data centered about the given pixel;

the update parameter (PAR) can range between −8 and +8;

TH3 is selected from the range of 3 to 5; and

TH4 is selected from the range of 6 to 7.

59. The computer-readable carrier claim 58, wherein TH3 is 5 and TH4 is 7.

60. The computer-readable carrier of claim 43, wherein the computer-readable carrier is adapted to cause the computer to apply frame integration after the step of correcting by:
- multiplying each pixel value of corrected image data produced from said correcting by a first fractional number (f1) to provide first integration data;
- multiplying each pixel value of an existing frame of recursively processed image data by a second fractional number (f2) to provide second integration data; and
- adding the first integration data and the second integration data to provide frame-integrated data,
- wherein the computer-readable carrier is adapted cause the computer to calculate the update parameter using the frame-integrated data.

61. The computer-readable carrier of claim 60, wherein f2+f1=1.

62. The computer-readable carrier of claim 61, wherein f2 is selected from the range of 0.90 to 0.99.

63. The computer-readable carrier of claim 60, wherein the computer-readable carrier is adapted to cause the computer to generate the existing frame of recursively processed image data by successive iterations of processing successive frames of image data from the detector, wherein the existing frame of recursively processed image data is generated by averaging successive frames of pixel data generated from the step of correcting during the iterations such that each successive stored frame of recursively processed image data is corrected using updated offset coefficients from an immediately preceding iteration.

* * * * *